Oct. 25, 1938.   K. C. BECKETT ET AL   2,133,945
THERMAL CUT-OUT
Filed April 21, 1934   3 Sheets-Sheet 1

Inventors:
Kenneth C. Beckett,
Sigurd I. Lindell.
By Mawr Jackson Boettcher Drewer
Attys.

Oct. 25, 1938.  K. C. BECKETT ET AL  2,133,945
THERMAL CUT-OUT
Filed April 21, 1934   3 Sheets-Sheet 2

Fig. 3. PART I.

Fig. 3. PART II.

Fig. 4.

Inventors:
Kenneth C. Beckett,
Sigurd I. Lindell.

Patented Oct. 25, 1938

2,133,945

UNITED STATES PATENT OFFICE 2,133,945

THERMAL CUT-OUT

Kenneth C. Beckett, Evanston, and Sigurd I. Lindell, Chicago, Ill., assignors to Schweitzer & Conrad, Inc., Chicago, Ill., a corporation of Delaware Application April 21, 1934, Serial No. 721,706

22 Claims. (Cl. 200—142)

Our invention relates to the prevention of transformer explosions by the application of a thermally actuated circuit interrupter, which is capable of disconnecting the transformer before the transformer oil reaches a temperature at which explosive vapors are generated.

Protection against damage to transformer insulation due to connection of excessive load to a transformer can be accomplished by circuit interrupting devices which are actuated by either the input or the output current. Such protection, however, requires that circuit interrupting devices be applied for each transformer. This scheme of protection is of no practical value in a network system because one circuit interrupting device may control the operation of a number of transformer units. However, these devices are incapable of protecting transformers from explosions, for the reasons outlined below.

When a power transformer is loaded, the difference between the input and the output (or the losses) amounts to only a small percent of the capacity of the transformer. These losses generate heat in the transformer windings. The transformer windings are immersed in a high grade mineral oil, and the volume of the oil, and also the radiating surfaces of the enclosed tank, are proportioned so that at maximum load and at maximum ambient temperature, the dissipation of heat from the transformer windings is sufficient to limit the temperature rise to a value which will insure a reasonable life of the winding insulation.

It will be apparent, however, that since the heat dissipation facilities of a transformer are limited to only a small percent of the transformer capacity, any condition which increases the generation of heat in the transformer oil beyond the rate corresponding to normal load conditions will result in decreased life of transformer insulation. Transil oil gives off explosive vapors when it is heated to approximately 132° C., and if transformer explosions are to be prevented it is necessary to disconnect the transformer before the temperature of the oil reaches 132° C.

In transformer installations, particularly those supplying A. C. networks, both the ambient temperature and the loads may be excessive. One feeder breaker may control a large number of step-down transformers and, consequently, the possible overload protection to an individual transformer is negligible. In such installations deterioration of winding insulation is not uncommon, causing short circuits between turns of the windings. When this condition exists the heat generated in the transformer tank is greatly increased, resulting in excessive oil temperatures and progressive deterioration of the windings. When final breakdown occurs, the resultant arc ignites the oil vapors and causes disastrous explosions.

A primary object of the present invention is the provision of an enclosed circuit breaker, controlled by thermal release device, which rapidly responds to temperature changes in the transformer oil.

The amount of energy represented by even a small flow of current may be very large, considering that the voltages now in common use are of great magnitude.

If, through failure of the insulation of the windings, leakage of current from the intended path should occur, it would release large amounts of energy in the transformer casing. But the amount of current increase above normal would be small. Assume, for example, a short circuited turn on the high tension side. The increase of current might be so small as not to be effective upon a fuse or relay intended for such protection. The continued release of energy as heat would heat up the oil until the flash point were reached, and an explosion, with scattering of burning oil, might result.

Since the energy release in the transformer case is the thing to be guarded against, and since that appears as heat, we interrupt the flow of energy through the transformer upon predetermined rise of temperature of the transformer, particularly the oil insulating bath, above normal working temperature.

The installation of a separate high tension oil switch with thermal control for this purpose would entail a very large expense. We propose, according to the present invention, to provide a device which constitutes a thermally released circuit interrupter directly responsive to the temperature of the transformer. While we describe the device as applied to a transformer, it is to be understood that any similar piece of equipment may be protected in a similar manner.

Whereas the device is thermally sensitive to such a rise in temperature as indicates likelihood of injury, it must electrically be of a relatively high current interrupting capacity. This is for the reason that while it must be sensitive to any disorder of the circuit which gives rise to dangerous temperature conditions, it must have sufficient thermal capacity in the contacts and associated parts to carry current occurring during secondary short circuit until this short is interrupted by some other means. The thermal release element is affected only by abnormal temperatures in the transil oil, and when release is effected it may not have to interrupt anything like the short circuit capacity of the connected source of power. Nevertheless, on the primary side, the failure may be anything from a high impedance fault to a dead short circuit.

According to the present invention, we dispose the thermally controlled element, which restrains operation of the circuit interrupter, in thermal relation to the bath of oil in which the transformer windings are disposed. The oil prevents localized overheating, and by its average temperature indicates the rate of energy release. Obviously, the same method of control may be applied to any electrically operating device. For example, the lubricating oil of an electrically driven machine may be utilized as the heat transfer link, or the cooling water in a water cooled electrically driven machine may be so employed.

In the case of a transformer, preferably we dispose the circuit interrupter within the bath of insulating oil of the transformer, or within a liquid filled container which is a part of or thermally in contact with the insulating liquid of the transformer. When the device operates to interrupt and disconnect the circuit, it is removed and reset at the shop, a fresh unit being meanwhile substituted. While the thermally sensitive element is necessarily in thermal contact with the liquid bath, the interrupter itself might, if desired, be disposed outside the tank, as disclosed in the copending application of Triplett and Lindell, Serial No. 722,280, filed April 25, 1934.

In the preferred form of our invention as herein illustrated, a spring operated circuit interrupter of high current interrupting ability is normally held closed by a detent or a tether which is thermally responsive. According to the preferred form of our invention, the entire unit is enclosed and submerged directly in the oil of the transformer. The thermally sensitive tether or detent is exposed to the oil temperature and the circuit interrupter is connected in the primary circuit of the transformer.

The specific method of securing high interrupting capacity in small space may be widely varied. In the particular form herein shown, spring operated contacts are adapted to separate in a body of arc extinguishing liquid which, when subjected to the arc, is vaporized, producing pressure and turbulency assisting in the extinction of the arc. This liquid serves a further purpose of acting as an interposed dielectric when the contacts are separated to prevent restriking of the arc. Any known or preferred method of arc interruption may be employed within the broad scope of our invention.

The detent or restraining tether for the contact is preferably of the multiple lever type shown in Ramsey Patent No. 1,907,581, because of the desirable characteristic of progressively increasing release effected thereby, but the invention is not to be limited to that specific form of restraining element. The main switch contacts are intended to carry all of the current and the restraining element or tether is not intended to be included in circuit at any time.

While we show a body of fusible alloy, it is to be understood that we may use any material responsive to temperature to control the trip or release. While the sensitive element is preferably remote from the contacts for reasons which will become apparent as the specific description proceeds, it is to be understood that the invention is not to be limited to a specific location of the thermally responsive element except as specifically pointed out in the appended specification and claims. The thermally sensitive material is preferably metal because of the high heat conductivity and strength as compared with other materials and the ease of securing uniformity of material, and hence of performance of the device.

In mounting our device it is desirable to have the thermally responsive element as closely coupled thermally as possible to the oil bath which serves as a connecting link between the transformer windings and the thermally sensitive element, and to foster such close coupling we have disposed the thermally sensitive member in a housing of small thermal capacity and good thermal conductivity, where a response to danger conditions may be most quickly and easily obtained. Also, it is to be observed that we have made the mass of the thermally sensitive body of metal as small as possible so as to require a minimum transfer of heat to effect operation. As a further feature it is to be noted that the ratio of surface to volume is high, so that heat can pass into the metal with little resistance to flow. Since the mass of metal is so small, the amount of mechanical stress that it can sustain is low. By the provision of the mechanical advantage device this difficulty is obviated and a highly desirable construction is the result.

Now in order to acquaint those skilled in the art with the manner of constructing and operating a device embodying our invention we shall describe, in conjunction with the accompanying drawings, a specific embodiment of the same.

Figures 1, 2, 5:
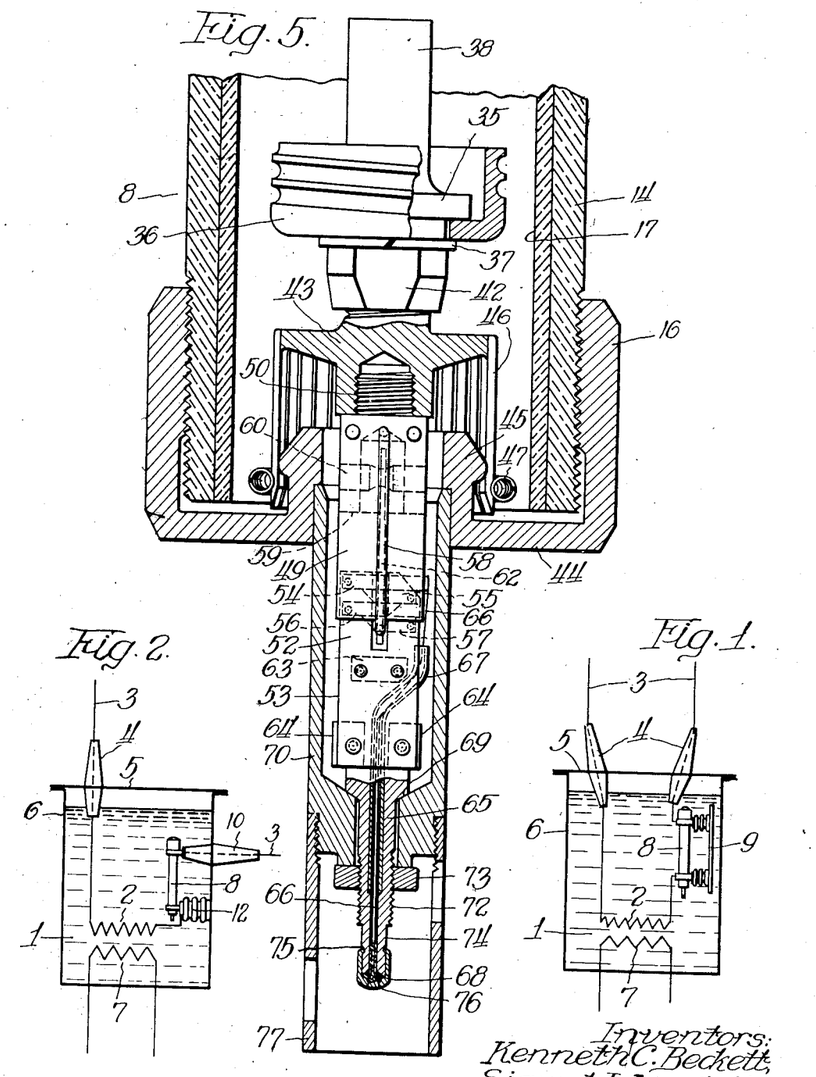
Figure 1 is a diagrammatic illustration of a device of our invention disposed in a transformer tank.
Figure 2 is a similar diagram of a modified form of mounting.
Figure 5 is an enlarged showing of the release element and the switch contacts.

Referring first to Figure 1, we have shown the transformer 1 having a primary winding 2 connected to the high tension leads 3—3 through bushings 4—4 extending through the cover 5 of the casing 6. The low tension winding 7 extends to the load or to the instrument. The tank 6 is substantially filled with insulating oil which forms a bath for the winding and the core of the transformer. In one or both of the leads 3 we provide the thermally controlled switch element 8 mounted upon a suitable mounting 9 disposed within the tank 6 and submerged in the body of oil.

An alternative method of mounting the thermally controlled circuit interrupter 8 is shown in Figure 2. In this construction, instead of having the switch element disposed on a separate mounting, it has one end, in this case shown as the upper end, mounted on the bushing insulator 10. The other end is mounted on a post insulator 12. The device may be disposed at an angle or substantial horizontally, if desired. This is optional.

As heretofore explained, the element 8 is not intended to be responsive to current flow directly. It is, however, responsive to the temperature in the surrounding medium (in this case the oil) and the temperature of the oil is indicative of the energy release occurring in the windings 2 and 7, or in any part of the circuits of the same which are in thermally conductive relation to the body of oil. It is well known that the normal heat loss is easily dissipated through the body of oil and from the outside of the transformer casing, but that if the generation of heat exceeds the normal rate of heat loss, the temperature of the body of oil tends to rise to destructive values. It is, of course, true that the rate of heat dissipation from the tank 6 increases as the temperature of the oil therein increases, but if the rate of heat liberation is such as to bring the temperature of the oil to a dangerous point, the transformer must be disconnected. It is desirable to have the response of the safety device 8 occur as soon as the oil temperature reaches approximately 100° C. At 120° C. the transformer oil usually employed gives off explosive vapors.

In one form of the protective unit 8 shown in Figures 1 to 5, inclusive, an elongated tubular housing, somewhat in the general contour and appearance of a high tension fuse, is provided. A sleeve of insulation 14 which is preferably paper or fibre impregnated with Bakelite, is threaded at its upper and lower ends into the cylindrical fittings 15 and 16 which constitute external terminals resembling the usual ferrules of high tension fuses. A sleeve 14 of glass may be employed. The unit 8 is adapted to be mounted in spring jaws engaging the metallic fittings or ferrules 15 and 16 in known manner. The Bakelite outer sleeve 14 is preferably lined with a fibre sleeve 17 which increases both the strength of the housing and also protects the main sleeve 14 from injury by the arc. The upper ferrule or cap 15 comprises the threaded cylindrical ferrule-like portion and a cover member 18, the cover and main body having cooperating flanges for the reception of cap screws 19 to secure the two parts together. The cap and body have a tapered joint 20 which may be sealed with a suitable compound. An inwardly extending flange 23 disposed above the cylindrical portion 22 is formed by a counterbore 24 formed in the upper end of the head portion 25. A spring contact plate 26 comprising a slotted flange 27 is disposed in the counterbore 24, the flange radially engaging the cylindrical bore 24 and axially resting upon the flange 23. A spring anchor stud 28 extends through the center of the plate 26 and is held by a nut 29.

Figures 3, 4:
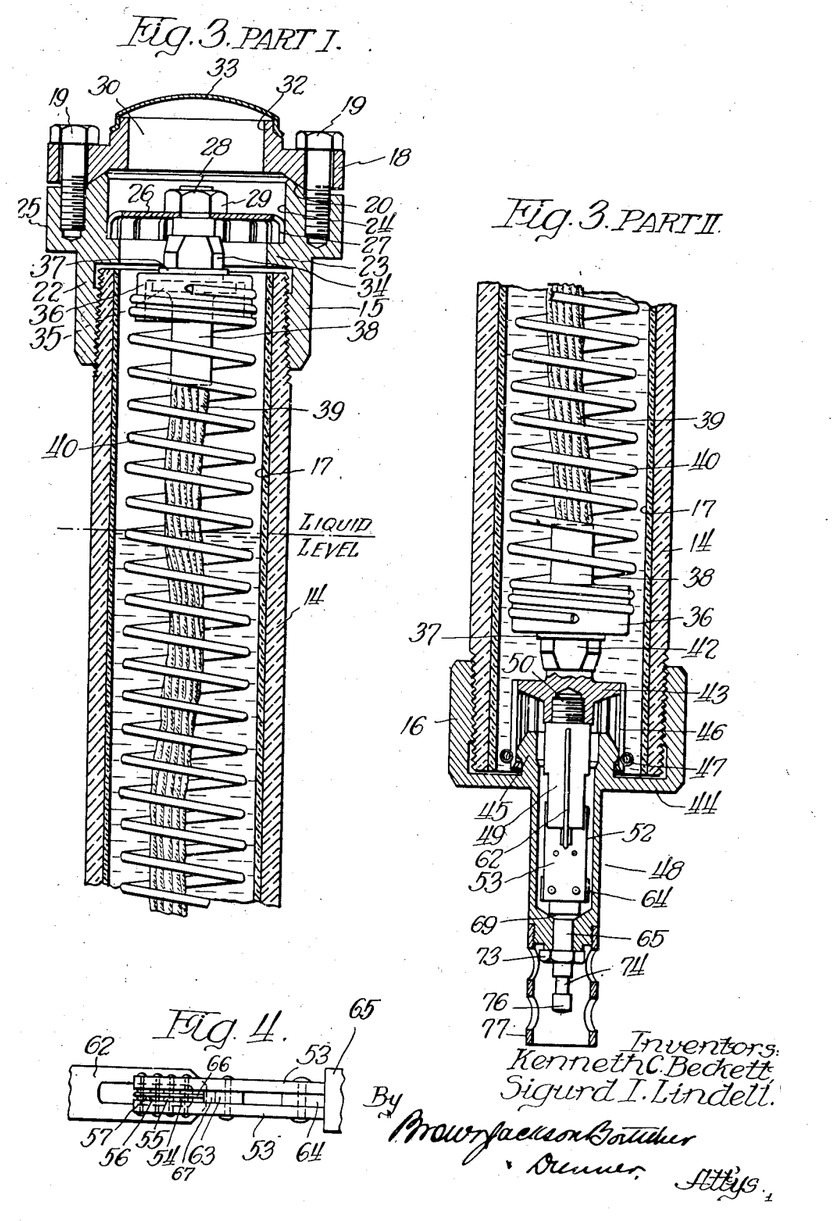
Figure 3 is a longitudinal vertical section of an embodiment of our invention, part 1 being the upper portion thereof and part 2 being the lower portion thereof.
Figure 4 is a side elevational view of a part of the release element.

The cover member 18 has a vent opening 30 surrounded by a flange 32. A cap 33, releasable upon the accumulation of a predetermined internal pressure in the unit 8, is sealed to the flange 32 and closes the opening 30. A suitable sealing compound, as heretofore known, may be employed for holding the cap securely in fluid-tight relation.

The anchor stud 28 comprises an upper threaded portion held by the nut 29 and a shank portion 34 below which is disposed a flange 35. A sheet metal spring anchor cup 36 having a hole through the bottom thereof is passed over the shank 34 and held in place by a spring ring 37 which drops into a groove formed in the shank 34. Below the flange 35 there is provided a hollow socket 38 in which is gripped the upper end of the flexible conductor 39. A helical wire spring 40 has its upper end anchored to the cup 36, a suitable groove being formed in the outer wall of the cup 36 to receive the uppermost coils of the spring 40. A substantially similar coupling for the lower end of the spring 40 and the flexible stranded conductor 39 is provided at the lower end. The stud 42, which is similar to the shank 34 of stud 28, is threaded internally to receive a cooperating threaded stud forming a part of the movable switch contact 43. The lower end of the spring 40 engages with its lowermost coils the metal cup 36 which is held between an integral flange like the flange 35 and the snap ring 37. The lower end of the flexible conductor 39 is likewise mounted in a socket 38 preferably formed integrally with the shank 42. The connection between the flexible stranded conductor 39 and the said sockets is preferably made by pinching the sockets upon the ends of the flexible conductor.

The lower fitting or ferrule 16 forms a cap for the lower end of the sleeves 14 and 17. The end wall 44 has an inwardly extending contact portion 45 of annular form. The movable contact 43 is provided, preferably, with a tubular split contact portion 46 which is slotted lengthwise to form a series of spring fingers. A contractile spring band 47, formed of a small coiled wire spring seating in a groove formed externally of the contact portion 46, insures a yielding, but satisfactory current conducting contact between the members 43 and 45.

The thermally sensitive detent indicated generally at 48 constitutes a highly organized mechanism for holding the switch contacts in engagement against the tension of the spring 40 and to release the same upon a predetermined temperature prevailing in the surrounding medium.

A substantially rectangular anchor member 49 comprises side plates of metal or insulation and an intermediate block 59 which has a threaded stud 50 threaded into a socket in the movable contact member 43. The opposite end of the anchor member 49 is slotted away by a cut or kerf wide enough to provide for the free entry of the cooperating holding member 52. The holding member 52 comprises a pair of flat plates 53—53, preferably of metal but optionally of insulation, which form fastening or clamping plates in which a series of levers 54, 55, 56 and 57 are pivoted. The anchor member 49, with the provision of the main slot above referred to, thus provides a pair of plates extending along the outside of the plates 53—53 for a short distance. The anchor member 49 is further provided with a narrow transverse slot extending completely through the body thereof at right angles to the first slot and extending down to approximately the threaded stud portion 50. The main slot or kerf extends down only to the dotted line 59 shown in Figure 5 to leave stops for the support of a cross pin 60. The central part of the anchor member 49 is drilled to provide a bore for clearing the central part of the pin. The pin is grooved at its center to receive a sheet metal suspension strip or link 62. This suspension strip or link may consist of a piece of sheet stock having a central longitudinally extending slot for receiving the pin 60 and the levers 54 to 57 or, if desired, separate slots, one at each end, may be provided. The bearing plates or side plates 53 of the holding member 52 are spaced apart and held in definite position by the spacing block 63 shown in dotted lines in Figure 5, and by tongues 64, 64 forming an extension of the anchor stud or bolt 65. Suitable rivets hold the bearing plates 53 upon the spacing block 63 and the tongues 64.

The leverage system herein shown is similar to that disclosed in the aforesaid Ramsey Patent No. 1,907,581. The suspension strip 62 bears against the lever 57, which is organized as a first class lever. The lever 57, in turn, bears against the lever 56, which is organized as a second class lever. The lever 56, in turn, bears against the lever 55, also of the second class, and the lever 55 in turn bears upon the final lever 54, this also being organized as a lever of the second class. The lever 54 is long enough to extend out beyond the side plates, or substantially so, in order to clear the other levers of the system. One or more tension strands 66, preferably wires of very high tensile strenth, extend from the end of the lever 54 through a guiding sleeve or conduit 67 to the button or plug 68 of thermally responsive metal.

The sleeve or conduit 67 extends between the side or bearing plates 53 and through the major part of the bolt or shank 65, this bolt being hollow. The bolt 65 has a conical shoulder which cooperates with a corresponding conical internal shoulder in the tubular extension 70 of the end wall 44 of the cap or ferrule 16. The tubular extension 70 may be made integral with the cap member or it may be manufactured as a separate part suitably secured in place. The outer end of the bolt 65 is threaded as indicated at 72 to receive a nut 73 by means of which the conical shoulder 69 is drawn up against the conical seat in the tubular member 70. A suitable sealing compound may be employed at this conical shoulder to form a fluid-tight seal. The outer end of the bolt 65 constitutes a metallic neck indicated generally at 74. The outer end of the neck portion 74 is grooved as indicated at 75 and a cap 76 has its edge or margin crimped or shrunk into the groove. Within the cap 76 and resting against the end of the neck portion 74 is the mass of alloy 68 in which is embedded the end of the wire 66, this end of the wire being preferably formed into a hook or hairpin turn in order to anchor the same in the said body of alloy. Where more than one strand 66 is employed, each strand is separately bent into hairpin shape, or hook, so as to anchor itself individually in the alloy 68. A tubular perforated guard 77 is threaded upon the end of the tubular extension 70 so as to protect the extending neck portion 74 and the head or cap 76 from injury.

It can be seen from the above that the fusible alloy 68, which preferably melts at about 100° C. and releases the tension strand 66, thereby releasing the lever system, is put in position thermally to be responsive immediately to changes in temperature of the surrounding medium. The relatively long neck and remoteness mechanically and thermally, serves to remove, as far as possible, the controlling body of thermally responsive metal 68 from the liquid within the main housing.

It is intended, as far as possible, to remove the thermostatic control from the switch contacts and at the same time insure that the thermostatic control is as quickly and accurately responsive to changes in temperature of the surrounding medium as resonably possible.

The side plates 53 and the levers 54 to 57, inclusive, are preferably made of metal but optionally may be made of insulating material. The anchor member 49 may likewise be made of metal or insulating material, if desired. It is not intended that any current should normally be carried through the thermostatic unit. If the tension strand 66 should accidentally restrain the switch element from becoming fully opened, the current flow therethrough would very quickly melt the same and continue the release, but it is intended that such shall not be necessary. The anchorage of the strand 66 to the lever 54 comprises merely a head upon the strand 66, the adjacent end of the lever 54 being slotted to receive the body of the strand therethrough but not to pass said head. The sides of the slot are then squeezed together upon strand 66. Hence, upon release of the lever system, any tendency of the strand or wire 66 to hold the suspension strip would result in the tension strand being pulled loose either out of the slot in which it is seated, or out of tube 67, and the parts thereby separated and released.

The unit 8 is preferably filled with an arc extinguishing liquid to the level indicated in Figure 3, part 1, or thereabouts. It is contemplated within the present invention that a suitable arc extinguishing material shall be employed to insure operation of the device. The liquid, which may be of the character heretofore employed, in Schweitzer & Conrad liquid fuses is one type of arc extinguishing material.

It is not intended that the device should vent in normal operation, but the safety cover 33 is provided to relieve excessive pressure within the device where that becomes necessary.

While in the preferred practice of the invention the unit 8 is intended to be factory refilled for uniform results, those skilled in the art will readily appreciate that the device may be organized to be refilled in the field.

In operation the device performs as follows: Assuming that the unit 8 is mounted as shown in Figure 1 within the tank of the oil switch, and is exposed to the temperature of the surrounding oil, the oil may circulate freely through the protective housing 77 in contact with the neck 74 and head 76. These parts are in close thermal coupling with the button or mass of fusible alloy 68. As soon as the temperature of the oil raises the body of alloy 68 to the fusion temperature, the tension member 66, no longer gaining support in the fusible alloy, is pulled upward as viewed in Figure 5, by the tension of the spring 40 exerted through the compound leverage system. It is to be observed that the leverage system provides a cumulative release, that is to say, as soon as the lever starts to move, the mechanical advantage provided over the spring is rapidly reduced and the suspension strip is released, swinging the levers between the plates 53 and permitting the suspension strip 62 to pass down through the slot formed in the plates 53, completely freeing the suspension strip of any restraint. This allows the contact 46 to leave the stationary contact 45 and the circuit of the transformer primary winding is thus opened. The arc extinguishing liquid is acted upon by the arc and a vapor and gases are evolved which react upon the arc to produce an extinguishing or deionizing effect upon the arc so that as the current passes towards or through zero in the cyclical variation the arc will be extinguished and current will cease to flow through the circuit.

We are aware that more highly organized methods of arc extinguishment may be combined with the fundamentals of our invention, and we intend our claims to be broad enough to protect our invention even in such form.

The temperature sensitive element of the above assembly consists of an alloy (melting point 100 C.) of definite dimensions, moulded in a receptacle of thin-walled material, such as copper, which material will conduct the heat from the surrounding medium to the alloy in a minimum of time. Loss of heat by conduction to the adjacent metal parts of the assembly is prevented by the long neck of alloy communicating with the bulb of alloy, and also, by making the section of metal communicating with the bulb, of minimum section, consistent with desired mechanical strength. The tension member in this assembly consists of a hairpin loop of nichrome wire. This element is cast in the alloy plug. No dependence is placed on soldering, and the alloy must be brought to the state of flux before the bond with the tension member is broken. The tension member is connected through a lever system, such as is employed in U. S. Patent No. 1,907,581, issued May 9, 1933, for the purpose of reducing the tension to be carried by the alloy bond, to approximately 1/150 of the pull exerted by the spring provided in the thermal element assembly, to accomplish the desired mechanical operation following the release of the thermal element.

The above construction results in an assembly, in which the temperature of the alloy closely follows that of the surrounding medium. This feature is a necessary characteristic, because without it, accurate time temperature characteristics cannot be obtained.

It should be kept in mind that the device must perform as intended during transient conditions of heat flow, in which the rate of heat generation, and the rate of temperature increase, may vary from a very gradual nature to a rapid growth. Therefore it is essential that the heat flow resistance of the thermal element be reduced to a minimum, in order to limit the temperature lag between the surrounding oil, and the alloy to a value that prevents the temperature of the oil from reaching dangerous values. To accomplish this with the alloy located inside of a completely enclosed short circuit interrupting unit presents the real operating problem.

Figure 6:
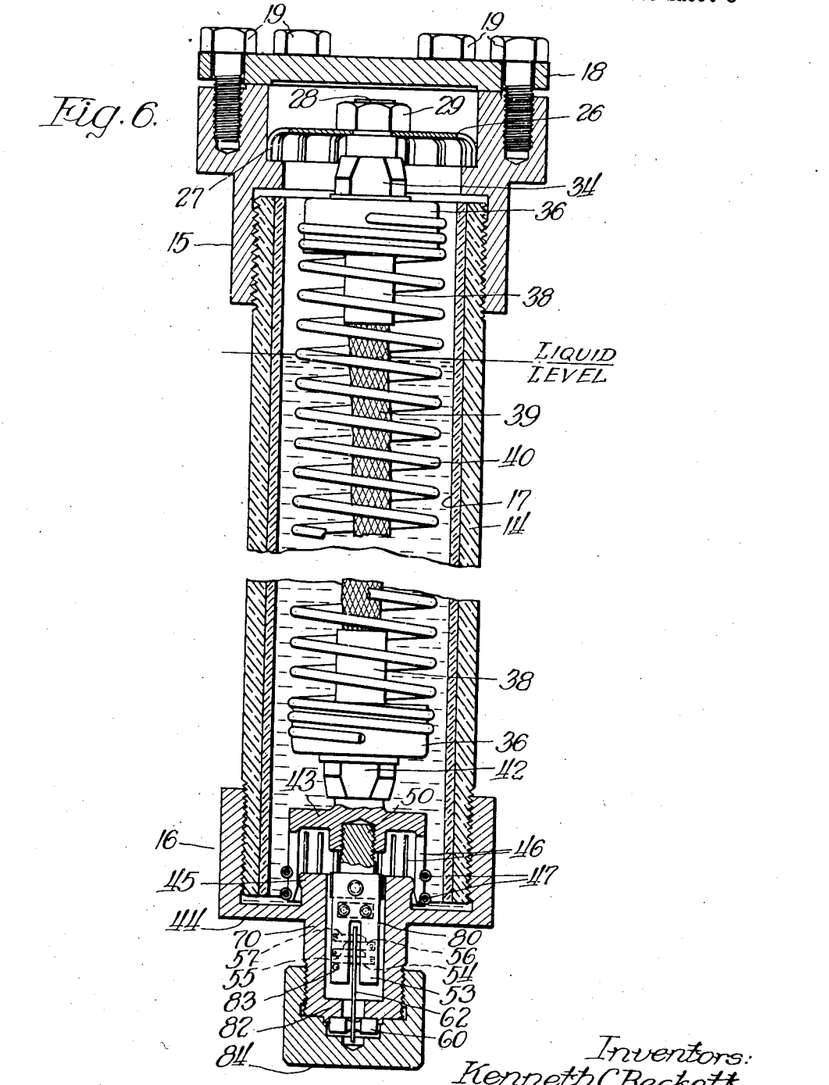
Figure 6 is a longitudinal vertical section through a modification of our invention.

In Figure 6 we have shown a modified embodiment of our invention which employs a similar structure, differing chiefly in details, and a less highly organized thermally controlled restraining element. This form of the device is not so quickly and accurately responsive to temperature changes as the device of Figure 3.

In this construction, the main body of the device is similar to that shown in Figures 1 to 5, inclusive. The main switch contacts 45 and 46, which are the same as those described in connection with Figures 1 to 5, inclusive, are held in engagement by the resiliency of the spring fingers 46 backed up by the encircling contracting springs 47. The main helical spring 40, which tends to separate the main contacts 45, 46, is held under tension by a thermally controlled holding element, in this case a separable anchor member 80 comprising a pair of plates of insulation 53 between which are pivoted a series of levers of the second class, 54 to 57, inclusive, arranged in substantialy the same relation shown in Figure 5. In this case, the plates 53 are mounted directly on the stud 58 that is threaded into a socket in the movable switch member 43. The plates 53 are slotted transversely to receive the suspension strip 62. The suspension strip forms, in effect, a loop bearing against the first lever 57 of the series and at the other end being held by the grooved pin 60 which rests against a flange 82 formed on the neck or reduced housing 70 extending from the end wall 44 of the ferrule or cap 16. The final lever 54, at its free end, bears upon a pin 83 formed of fusible alloy of the same character or similar character to that employed in making up the button 68 in the embodiment of Fig. 5. The pin 83 extends through aligned holes in the two side plates 53 and prevents the lever 54 from swinging in a counterclockwise direction as viewed in Figure 6. The pin 83 is not in direct thermal contact with any part of the housing, it being mounted solely in the side plates 53 between which the compound levers are mounted to swing. If, however, the temperature of the device rises to a point where the pin 83 is melted, then the compounded system of levers releases the suspension strip 62, or, more accurately, releases the levers and their supporting plates 53 from the supenion trip 62, to permit the spring 40 to open the switch. The outer end of the neck portion 70 is threaded to receive a cap 84 which forms a fluid-tight seal, a suitable compound preferably being employed to assist in making said seal.

It will be observed that the cap 18 which closes the upper ferrule does not have any release vent, as it is intended that the present device shall operate without venting it to the surrounding medium. The housing is substantially filled with arc extinguishing liquid, as in the case of the device shown in Figs. 3 to 5. This liquid, in each case, may be any of the known arc extinguishing liquids such, for example, as halogen derivatives of hydrocarbon, or any of them.

This liquid, after serving to extinguish the arc, forms a dielectric medium which is interposed betwen the contacts to assist in preventing reestablishment of the arc after the same is once extinguished.

It will be apparent to those skilled in the art that the device of our invention may be embodied in various forms, and we intend to include all such variations as come within the spirit of the present invention.

We do not intend to be limited to the details shown and described except as they are recited in the appended claims.

We claim:

1. In a device of the class described, a housing comprising an elongated tubular sleeve having a conducting ferrule at each end, a pair of separable contact members in said housing for interconnecting said ferrules, a spring for separating said contact members, means within said housing for deionizing the arc produced upon separation of said contact members, a detent within said housing for restraining separation of said contact members, and a body of material having a relatively low melting point disposed in non-current conducting relation with respect to the current flow between said ferrules, said body of material being arranged and adapted to be responsive to the ambient temperature of said device for releasing said detent by melting to permit separation of said contact members when said temperature reaches a predetermined point.

2. In a device of the class described, a closed housing having external terminals, a pair of switch contact members normally in engagement in said housing for interconnecting said terminals, a spring for separating said contact members, a body of material having a relatively low melting point disposed in non-current conducting relation with respect to the current flow between said terminals, said body of material being arranged and adapted to be responsive to the ambient temperature of said device by melting when said temperature exceeds a predetermined point, and power multiplying means interposed between said contact members and said body for preventing separation of said contact members as long as said temperature is below said predetermined point.

3. In a device of the class described, a closed housing comprising a sleeve of insulation, metal caps for the ends of the sleeve providing external terminals, separable contact members in said housing connected to said caps and being normally in contact to complete a circuit through the device, spring means tending to separate said contact members, a lever restraining the action of the spring, a tension element holding said lever against release, an extension on one of said caps forming a supplemental housing, and a body of material having a relatively low melting point disposed in said extension in non-current conducting relation with respect to the current flow through said device for anchoring said tension element, said body of material being arranged and adapted to be responsive to the ambient temperature of said extension for releasing said tension member by melting to permit separation of said contact members when said temperature reaches a predetermined point.

4. In a device of the class described, a housing comprising a sleeve, caps for the ends of the sleeve providing external terminals, switch contacts in said housing connected to said caps and being normally in contact, spring means tending to separate said contacts, a lever restraining the action of the spring, a tension element holding said lever against release, and a body of temperature responsive material anchoring said tension element, one of said caps having an extension forming a supplemental housing in which said temperature responsive material is disposed to bring the same into close thermal coupling with the surrounding medium, said supplemental housing comprising a metallic tube through which said tension element projects, the temperature responsive material forming a button on said tension element, which button is disposed at the outer end of the tube, and a protective cover for the outer end of the tube.

5. In a device of the class described, a closed switch housing, a spring operable switch in the housing and thermally releasable means for said switch comprising a tension link for holding the switch closed, a compound lever connected at one end to the tension link, a tension strand connected at the other end of the lever, an anchorage for the strand comprising a body of thermally responsive material and a metallic support of low thermal capacity against which said body of material rests, said material being disposed completely within said housing.

6. In a device of the class described, a tubular switch housing, a pair of switch contacts therein, a spring tending to separate said contacts, a tether for the spring, comprising a lever frame, a plurality of interengaging levers supported in said frame and forming a compound leverage, a link connected between one end of said compound leverage and said spring, a flexible tension strand connected to the other end of said leverage, said frame having an extension comprising a tubular bolt projecting through the housing and anchored against the same, said tension strand extending through said tubular bolt, a body of thermally responsive material carried on the end of said bolt and holding said strand, and a cover for enclosing said body of material.

7. In a device of the class described, a tubular insulating housing having metallic caps at each end, normally engaged telescopic switch contacts connected to said caps, comprising a stationary switch contact carried on one cap, a movable switch contact for cooperating with the stationary contact, a spring anchored on said other cap for moving the latter contact away from the former, a tension element connected to said movable contact, and projecting axially through the said one cap, a closed tubular extension of said cap, and a releasable anchorage for said tension element inside of said tubular extension.

8. In a device of the class described, a lever frame having a shank for mounting the same, and a pair of plates connected to said shank, a slot extending through both plates, a plurality of levers of the second class compounded upon each other and being disposed between said plates, alternate levers being pivoted on opposite sides of said slot and extending across the slot, the last lever of the group being independently restrained, a thermally responsive flexible tension strand restraining said last named lever, said strand extending through said shank and having a fusible alloy button formed thereon, and a restrained element extending through said slot and resting upon the first lever of the group.

9. In a device of the class described, a housing, a pair of switch contacts in the housing, a spring for separating said contacts, a holding member for holding the contacts in engagement, said member being separable into two parts by the pull of the spring, and a thermally responsive element acting at a mechanical advantage over said spring for holding said parts together, said thermally responsive element being responsive to externally generated temperatures and being out of circuit with said switch contacts.

10. In a device of the class described, a pair of contacts, a spring for separating said contacts, a link extending from said spring, a lever connected to said link, a flexible tension strand connected to the lever to provide a mechanical advantage over the spring, a support through which said strand extends, said strand having a bend formed therein beyond said support, and a mass of fusible material in which said bend is embedded resting upon said support, said mass of fusible material being fusible by heat generated outside the device and being out of circuit with said contacts.

11. In a thermal protective switch for the protection of transformers and the like having a liquid insulating medium, a tubular sleeve of insulation having metallic caps at each end forming closures and external terminals and adapted to be immersed in said liquid insulating medium, a stationary switch contact mounted on the inside of the lower cap, a cooperating movable switch contact normally engaging the first contact, a spring for separating said contacts, said spring having one end anchored to said upper cap, a tension member anchored to said movable contact and extending through said cap, said cap having a closed tubular housing enclosing said tension member, and a body of low melting point within said closed extension anchoring said tension element, said body being disposed in non-conducting relation with respect to current flow through said switch and adapted to be responsive to the ambient temperature of said extension by melting when said temperature reaches a predetermined point and a body of arc extinguishing material surrounding the contacts in the lower part of said housing.

12. In a thermal protective switch for the protection of transformers and the like having a liquid insulating medium, a tubular sleeve of insulation having metallic caps at each end forming closures and external terminals and adapted to be immersed in said liquid insulating medium, a stationary switch contact mounted on the inside of the lower cap, a cooperating movable switch contact normally engaging the first contact, a spring for separating said contacts, said spring having one end anchored to said upper cap, a tension member anchored to said movable contact and extending through said cap, said cap having a closed tubular housing enclosing said tension member, a body of low melting point within said closed extension anchoring said tension element, said body being disposed in non-conducting relation with respect to current flow through said switch and adapted to be responsive to the ambient temperature of said extension by melting when said temperature reaches a predetermined point, and a body of arc extinguishing material surrounding the contacts in the lower part of said housing, said upper cap having a pressure releasable vent, said switch contacts being annular contacts and said tension member extending axially through said second named contact.

13. The combination of claim 11, wherein said tension element comprises a mechanical advantage device and said low melting point material sustains only a small part of the stress of said spring.

14. In combination a lever frame comprising a tubular shank having an annular seat for forming a fluid tight seat, a nut threaded upon said shank for drawing said annular seat against a support, said shank extending beyond said nut and terminating in an open end, a cap sealed over said open end, a body of low melting point alloy held against the open end of the shank under said cap, a flexible strand having its outer end embedded in said body of alloy and extending through said tubular shank, said frame comprising a pair of spaced plates, a lever of the second class disposed between and pivoted on said plates, said lever having its free end held by said strand, and a load link sustained by said lever.

15. In an automatic circuit interrupter, in combination, a pair of normally engaging separable contact members, means tending to separate said contact members, detent means for holding said contact members against separation, a body of material having a relatively low melting point disposed in non-current conducting relation with respect to current flow through said contact members, said body of material being arranged and adapted to melt when the ambient temperature exceeds a predetermined point, and means responsive to the melting of said body of material for effecting the operation of said detent means to permit separation of said contact members.

16. In an automatic circuit interrupter, in combination, a pair of normally engaging separable contact members, a pressure-tight housing for said contact members, means for biasing said contact members apart, a liquid arc extinguishing medium in said housing for extinguishing the arc drawn between said contact members, means for holding said contact members against separation, a body of material having a relatively low melting point disposed in said housing in non-current conducting relation with respect to current flow through said contact members, said body of material being arranged and adapted to melt when the ambient temperature exceeds a predetermined point, and means responsive to the melting of said body of material for effecting the operation of said holding means to permit separation of said contact members.

17. In an automatic circuit interrupter, in combination, a pressure-tight housing, a pair of normally engaging separable contact members in said housing, resilient means tending to separate said contact members, a liquid arc extinguishing medium in said housing for extinguishing the arc drawn between said contact members, detent means for holding said contact members against separation, a body of material having a relatively low melting point disposed exteriorly of said housing in non-current conducting relation with respect to current flow through said contact members, said body of material being arranged and adapted to melt when the ambient temperature exceeds a predetermined point, and means operatively extending into said housing and responsive to the melting of said body of material for effecting the operation of said holding means to permit separation of said contact members.

18. In a device of the class described, a closed switch housing, a spring operable switch in said housing and thermally releasable means for said switch comprising a tension link for holding the switch closed, a tension strand of relatively low thermal conductivity, an anchorage for the strand comprising a body of material having a relatively low melting point, a metallic support of relatively low thermal conductivity against which said body of material rests, and mechanical advantage means interconnecting said tension link and strand.

19. In combination, a casing, electric circuit terminals in said casing, operating means acting to separate said terminals; a body of low melting point metal for sustaining said operating means, said body of low melting point metal being disposed in non-current conducting relation with respect to current flow in the circuit and adapted to be melted when the ambient temperature exceeds a predetermined point; and a system of levers interposed between said body of low melting point metal and said operating means for reducing the force imposed on the former by the latter.

20. In a circuit interrupter, in combination, a pair of separable contact members for connection in an electric circuit, means biasing said contact members apart; a body of low melting point metal for opposing the action of said biasing means, said body of low melting point metal being disposed in non-current conducting relation with respect to current flow in said circuit and adapted to be melted when the ambient temperature exceeds a predetermined point; and mechanical advantage means operatively interconnecting said biasing means and said body of low melting point metal whereby a relatively small portion of the force of the former is imposed on the latter.

21. In an automatic circuit interrupter, in combination, a pair of normally engaging separable contact members, means tending to separate said contact members, detent means for holding said contact members against separation, a body of material having a relatively low melting point disposed in non-current conducting relation with respect to current flow through said contact members, said body of material being arranged and adapted to melt when the ambient temperature exceeds a predetermined point, and a tension element operatively interconnecting said detent means and said body of material and tensioned by said means tending to separate said terminals and arranged and adapted to be released on melting of said body of material to release said terminals.

22. A renewable unit for a circuit interrupter having a pair of biased apart terminals comprising, in combination; a body of low melting point metal for opposing the separation of said terminals, said body of low melting point metal being disposed in non-current conducting relation with respect to current flow through said terminals and adapted to be melted when the ambient temperature exceeds a predetermined point; a receptacle disposed to be detachably coupled to one of said terminals for receiving said body of low melting point metal, mechanical advantage means secured to said receptacle and disposed to be detachably coupled to the other of said terminals, and means operatively interconnecting said mechanical advantage means and said body of low melting point metal whereby a relatively small portion of the force applied to the former to separate said terminals is imposed on the latter.

KENNETH C. BECKETT.
SIGURD I. LINDELL.